Dec. 2, 1947.  L. RADO  2,431,827
MAGNETIC MARKER FOR MAPS
Filed Feb. 8, 1944
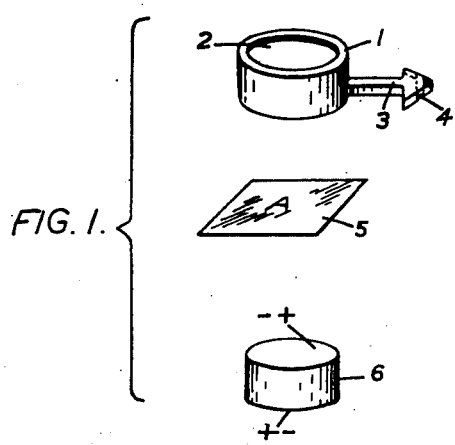
FIG. 1.
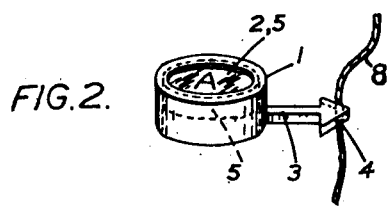
FIG. 2.
FIG. 3.
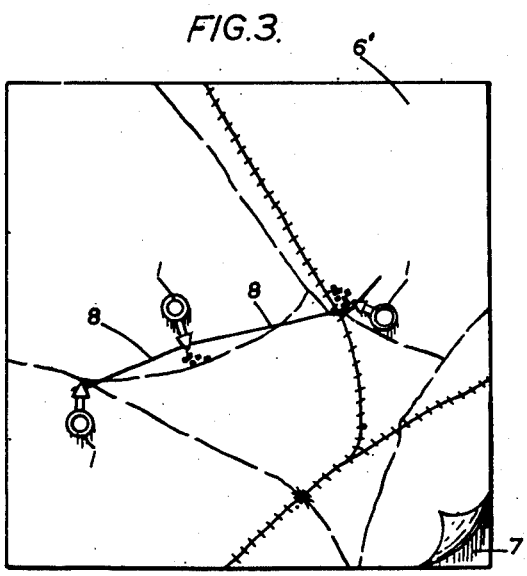
Leopold Rado
Inventor Patented Dec. 2, 1947

2,431,827

UNITED STATES PATENT OFFICE 2,431,827

MAGNETIC MARKER FOR MAPS

Leopold Rado, Whitehaven, England

Application February 8, 1944, Serial No. 521,753
In Great Britain February 5, 1943

2 Claims. (Cl. 40—142)

This invention relates to a marking device for geographical maps having a backing of magnetisable metal, such as sheet iron, on which the marking devices are held by magnetic force.

Displays, educational means, letterings, chess figures, and the like, held in position on a magnetisable iron backing by magnetic force have previously often been proposed. The figures themselves were permanent magnets.

The present invention proposes to produce the marking means of non-magnetisable material, preferably of plastics, and having a hollow therein into which hollow a permanent magnet will be so inserted that only the magnetic pole of the magnet lies free, and can thus exercise the magnetic force on a backing of magnetisable metal, such as iron. For the different shapes or figures only one shape of permanent magnet is necessary, for it will need to act only as a holding device for the sign-carrier of nonmagnetisable material, made, in particular, of plastics.

The permanent magnets cannot be produced in quantities easily in such an exact form that they exactly fit the hollows of the sign-carriers, and as it is essential to fix them therein it is proposed to keep the magnets smaller, and to wrap them in more or less resilient sheet, for example paper, or the like, which wrapping will hold them in the hollows of the sign-carriers and allow them, if necessary, to be changed. This will give also the advantage that the same magnet can be used for different shaped and colored sign-carriers, as the hollows thereof will be of the same dimensions so that the magnets can be exchanged as required.

If the sign-carrier is made for example of plastics and is provided to mark an exact spot on a geographical map, it is necessary to provide the sign-carrier with for example, an arrow, the point of which can lie precisely on the spot to which the marking means relate. This arrow can be coloured and be transparent so that the map can be seen therethrough. The arrow is sometimes very essential, particularly if the marking-means are too large in comparison to the scale of the map, and cover therefore a larger area than the marking means should indicate. As sometimes it will be inadequate to keep the sign-carrier to a certain shape or color, an opening on the top part of the sign-carrier is proposed through which the resilient wrapping of the magnet, of for example, paper, which serves to keep the magnet in the carrier, is visible. The material, wrapping the magnet, can be coloured as required, and can be lettered or marked by ink or the like if desired, and moreover the wrapping is changeable.

The accompanying drawing illustrates as an example, marking means for geographical maps.

Referring to the drawing:

Fig. 1 illustrates an example of marking means for geographical maps before assembly of the marking means with the magnet by the use of a wrapping, for example of paper.

Fig. 2 illustrates the assembled marking means.

Fig. 3 illustrates a geographical map on which the marking means are disposed.

In Fig. 1 a hollow body sign-carrier, made for example of plastics, is marked 1, and has a top opening, marked 2, and an arrow marked 3, which is provided with a slit 4, to hold a string. The wrapping, of for example paper, provided to hold the magnet in the hollow of the sign-carrier is marked 5, and the permanent magnet itself is marked 6, of which the top pole is negative or positive and the bottom pole positive or negative.

Fig. 2 shows the three parts of Fig. 1 assembled. The magnet is held in the hollow body by the help of the resilient wrapping, and the top of the sign-carrier is open and shows the marked wrapping. The slit 4 of the arrow 3 holds a string 8.

Fig. 3 shows a geographical map marked 6', and having a magnetisable metal backing 7, on which map the sign-carriers marked 1, are disposed, and the arrows of the sign-carriers by the help of the slits 4, mark a line by holding the string 8.

Non-magnetizable materials other than plastics can be used for the sign-carriers, such as for example glass.

What I desire to claim by Letters Patent of the United States is:

1. A geographical map and marker therefor, comprising: a map of paper or similar material, a backing of magnetized material for said map; a marker comprising a magnet of cylindrical form, a housing made of non-magnetic material and of the same shape as the magnet, the housing being of substantially the same size as the magnet and being open at the top and bottom, the magnet being placed in the housing with its axis placed vertically and its poles at the top and bottom surfaces, the housing having an arrow shape pointer extending from its periphery and flush with its bottom; the marker being movable over the surface of the map with the lower pole of the magnet under the influence of the magnetic backing.

2. A geographical map and marker therefor, comprising: a map of paper or similar material, a backing of magnetized material for said maps; a marker comprising a magnet of cylindrical form, a housing made of non-magnetic material and of the same shape as the magnet, the housing being of substantially the same size as the magnet and being open at the top and bottom, the magnet wrapped in resilient material being placed in the housing with its axis placed vertically and its poles at the top and bottom surfaces, the housing having an arrow shape pointer extending from its periphery and flush with its bottom; the marker being movable over the surface of the map with the lower pole of the magnet under the influence of the magnetic backing.

LEOPOLD RADO.

REFERENCES CITED

The following references are of record in the file of this patent:

UNITED STATES PATENTS

| Number | Name | Date |
|---|---|---|
| 960,715 | Schneider | June 7, 1910 |
| 1,985,259 | McIlroy et al. | Dec. 25, 1934 |
| 2,254,498 | Scharf | Sept. 2, 1941 |
| 2,323,837 | Neal | July 6, 1943 |

FOREIGN PATENTS

| Number | Country | Date |
|---|---|---|
| 622,991 | France | Mar. 8, 1927 |